United States Patent
Frank

(10) Patent No.: US 9,388,796 B2
(45) Date of Patent: Jul. 12, 2016

(54) ASSEMBLY FOR EXTRACTING THE ROTATIONAL ENERGY FROM THE ROTOR HUB OF THE WIND TURBINE OF A WIND TURBINE SYSTEM

(75) Inventor: Hubertus Frank, Höchstadt (DE)

(73) Assignee: IMO Holding GmbH (DE)

( * ) Notice: Subject to any disclaimer, the term of this patent is extended or adjusted under 35 U.S.C. 154(b) by 384 days.

(21) Appl. No.: 13/880,940

(22) PCT Filed: Oct. 11, 2011

(86) PCT No.: PCT/EP2011/005068
§ 371 (c)(1),
(2), (4) Date: Aug. 6, 2013

(87) PCT Pub. No.: WO2012/052123
PCT Pub. Date: Apr. 26, 2012

(65) Prior Publication Data
US 2013/0315736 A1    Nov. 28, 2013

(30) Foreign Application Priority Data

Oct. 21, 2010  (DE) .......................... 10 2010 049 023

(51) Int. Cl.
*F03D 9/00*  (2006.01)
*H02P 9/04*  (2006.01)
(Continued)

(52) U.S. Cl.
CPC ............ *F03D 11/02* (2013.01); *F03D 11/0008* (2013.01); *F16C 19/545* (2013.01); *F16H 57/08* (2013.01); *F05B 2260/40311* (2013.01);
(Continued)

(58) Field of Classification Search
USPC ...................................... 290/44, 55
See application file for complete search history.

(56) References Cited

U.S. PATENT DOCUMENTS 3,942,026 A * 3/1976 Carter ............................ 290/55
2004/0041409 A1* 3/2004 Gabrys .......................... 290/55
2009/0175724 A1* 7/2009 Russ et al. .................... 416/131

FOREIGN PATENT DOCUMENTS

DE     10318945     10/2004
DE     01954251     5/2005
(Continued)

OTHER PUBLICATIONS

Machine Translation of DE 10318945 retrieved from Patentscope.*
Machine Translation of DE 102007041508 retrieved from Espacenet.*

*Primary Examiner* — Tulsidas C Patel
*Assistant Examiner* — Thomas Quigley
(74) *Attorney, Agent, or Firm* — Pandiscio & Pandiscio

(57) ABSTRACT

An assembly for absorbing torques at the rotor hub of a wind turbine whose rotation axis extends toward the wind, and for diverting axial and radial forces and tilting moments into a load-bearing structure by means of a main bearing, and for extracting rotational energy from the rotor hub by means of a gear whose planet gears mesh with a sun gear and a ring gear, and comprising a generator connectable to an output side of the planetary gear, and operates to convert the rotational energy into electrical energy, wherein the planetary gear is integrated with a main bearing of a wind power plant, and the ring gear of the planetary gear is driven by the rotor hub, while the planet gear carrier is fixed to the chassis of a gondola of the power plant, and the sun gear of the planetary gear mechanism is drivingly connected to the generator, and the generator does nor protrude radially beyond the rotor bearing or main bearing.

26 Claims, 5 Drawing Sheets

(51) Int. Cl.
*F03D 11/02* (2006.01)
*F03D 11/00* (2006.01)
*F16C 19/54* (2006.01)
*F16H 57/08* (2006.01)
*F16H 1/22* (2006.01)

(52) U.S. Cl.
CPC ............... *F16H1/227* (2013.01); *Y02E 10/722* (2013.01); *Y02E 10/726* (2013.01)

(56) References Cited

FOREIGN PATENT DOCUMENTS

| | | |
|---|---|---|
| DE | 102007041508 | 3/2009 |
| WO | WO 02/14690 | 2/2002 |
| WO | WO 2010063291 A2 * | 6/2010 |
| WO | WO 2011/089036 | 7/2011 |

* cited by examiner

ASSEMBLY FOR EXTRACTING THE ROTATIONAL ENERGY FROM THE ROTOR HUB OF THE WIND TURBINE OF A WIND TURBINE SYSTEM

The invention relates to an assembly comprising a connection for the rotor hub of a wind turbine of a wind power plant whose rotor rotation axis points approximately in the direction of the wind during operation, for the purpose of absorbing all the forces and torques occurring there, and comprising at least one rotor bearing or main bearing for diverting axial and radial forces and tilting moments into a load-bearing structure of the wind power plant, further comprising a device for extracting the rotational energy from the rotor hub of the wind turbine in the form of a single-stage planetary gear mechanism, which is integrated with the rotor bearing or main bearing and whose planet gears are mounted on a planet gear carrier and simultaneously mesh with a sun gear and a ring gear, and comprising a generator which is or can be connected to the output side of the planetary gear mechanism and operates to convert the rotational energy into electrical energy.

An assembly of the above species is disclosed in WO 02/14690 A1 and the related DE 01 954 251 T1. Described therein is a drive assembly for a wind turbine, having a structure that carries a rotor hub and having a main bearing, a single-stage planetary gear mechanism and a generator. There, however, the outer ring of the main bearing is connected to or suitable for connection to a wind turbine rotor hub. Since the inner ring consequently has to be fixed to a load-bearing structure of the gondola or the like and thus is not available to transmit torques, an additional structure is necessary for tapping (drive) torques and must be connected to the rotor hub. Taken altogether, therefore, the result is a very elaborate design that also renders maintenance difficult.

From the disadvantages of the described prior art comes the problem initiating the invention, to further develop an assembly of the above species to be connected to the rotor hub of a wind turbine of a wind power plant in order to absorb the forces and torques arising there, in such a way that the drive power developed by the wind is separated from the other forces and torques by the simplest means and can ultimately be converted into electrical energy. In addition, the assembly to be provided should be as maintenance-friendly as possible, so that maintenance can be performed even on hard-to-access wind power plants—located, for example, on mountains or in the offshore region of the ocean—without auxiliary equipment, particularly without a crane.

This problem is solved by the fact that the inner ring of a rotor bearing or main bearing of the wind power plant has at one end face a connection surface for connection to the rotor hub of the wind power plant, has at its outer face one or more raceways for rolling elements that simultaneously roll along one or more raceways of the outer ring, and is provided at its inner face with a fully circumferential set of teeth from which the rotational energy is tapped.

The inner ring of the rotor bearing or main bearing thus becomes a sort of "shunt" for redirecting forces and torques: while axial and radial forces and tilting moments are diverted via the outer ring into a load-bearing structure of the wind power plant, the rotational energy of the hub can be tapped via the internal teeth of the inner ring. Only one design part is needed for this purpose, so the number of components is minimized and the susceptibility to failure is therefore also reduced to a minimum. In addition, connected gear mechanisms can easily be maintained from the back, i.e., from the rear area of the gondola, and even removed from the back if necessary, i.e. without the need to demount the rotor hub from the inner ring of the main bearing or rotor bearing. Such maintenance and/or repair work thus can be performed without a crane.

It has proven advantageous for the inner ring of the rotor bearing or main bearing to comprise, at its end face facing the rotor hub, particularly at its connection surface located there, connecting elements for attaching the rotor hub, preferably in the form of coronally distributed fastening bores, particularly in the form of coronally distributed blind bores with an internal thread. The rotor hub can be connected thereto by means of a corresponding number of screws, threaded bolts or the like, sufficiently firmly so that it will remain anchored securely to the bearing even during strong gusts of wind.

It is within the scope of the invention that the raceways provided on the inner ring for rolling elements running therealong and its circumferential teeth and/or its connecting elements for attaching the rotor hub are formed by machining or shaping a common base body. As a result of this measure, all the forces from the rotor hub are absorbed in a single base body, and thus, with no internal parts that are subject to play, are separated into axial and radial forces and tilting moments that are to be braced against, on the one hand, and the drive torque that is to be tapped, on the other. Since, due to the lack of any parts that move in relation to one another, there can be no play or other relative movement, such an inner ring is nearly wear-free.

The rotor bearing or main bearing is preferably configured as a multi-row ball bearing, conical bearing, barrel roller bearing, roller bearing and/or needle bearing. Mixed forms thereof are also encompassed, i.e., bearings with rows of different rolling elements, although an embodiment in the form of a multi-row rolling bearing having only one kind of rolling element is preferred. Whereas ball bearings may be able to get along with few rows of rolling elements, the other rolling-element geometries offer advantages under extreme airflow conditions, such as, for example, hurricane gusts, when the wind turbine is attacked by considerable forces that can be diverted safely only if the mounting system is extremely stable. It is advantageous here that the load-carrying capacity of a bearing that features linear contact, particularly a roller bearing, is generally higher than the load-carrying capacity of a comparable ball bearing having nearly punctiform contact areas. Linear contact generally occurs with rolling elements that have a clear axis of rotation, i.e., that are rotationally symmetrical, but not spherical. It is not critically important, in this regard, whether the diameter of a rolling element changes along the longitudinal direction of its axis of rotation, as in the case of barrel roller bearings or conical bearings, or whether it does not, as in the case of roller bearings or needle bearings.

The invention further provides that the inner ring of the rotor bearing or main bearing is configured as a so-called nose ring, with a fully circumferential flange at its outer face. Such a nose—i.e., a fully circumferential flange—is capable of transmitting particularly strong axial forces and tilting moments.

The invention can be developed further by disposing running surfaces for one or more rows of rolling elements at the peripheral and/or end face(s) of the fully circumferential flange. Rolling elements running along the two end faces of the flange preferably serve both to transmit axial compressive forces in both directions and to transmit tilting moments, while rolling elements running along a peripheral face transmit radial forces.

If the outer ring of the rotor bearing or main bearing is divided into a hub-side subring and a generator-side subring, then such a bearing is particularly easy to assemble, since the two subrings of the outer ring can be moved apart for the insertion of the inner ring.

Additional advantages are gained if the gap between the inner and the outer ring of the rotor bearing or main bearing is sealed, particularly in the region of the nose-side subring. This prevents the escape of a lubricant—preferably grease—and also the ingress of dirt and other particles. It also serves to keep out rain that would otherwise wash out any grease from inside.

Particularly simple construction is achieved if the fully circumferential set of teeth at the inner face of the inner ring of the rotor bearing or main bearing simultaneously forms the ring gear of the planetary gear mechanism, since, as a result of this measure, the inner ring of the rotor bearing or main bearing simultaneously becomes a component of the planetary gear mechanism.

It has proven worthwhile for all the components of the inventive assembly, including all the connected output drive elements, such as the gear mechanism, generator, brake, etc., to be located in the axial direction behind the connection surface of the inner ring. None of the components of the inventive assembly then extend into or even near the rotor hub, so if the hub has to be demounted, there is no danger to the gear parts or other parts of the inventive assembly. These are protected against damage, for example from collisions with the rotor hub hanging from a crane or the like, by the front connection surface of the inner ring.

The invention further provides that the planetary gear mechanism does not protrude in the radial direction beyond the rotor bearing or main bearing. As a result of this measure, the rotor bearing or main bearing has a maximum diameter that roughly corresponds to the hub diameter of the wind turbine and thus is also of the same order of magnitude as the cross section of the gondola in the front region, and it can therefore, if necessary, be demounted and pushed aside, i.e., into the center of the gondola.

The planetary gear mechanism can be disposed radially inside the rotor bearing or main bearing. This results in optimum use of space, thus making it possible to reduce the overall size of the gondola under some circumstances.

Particular advantages can be gained if the inner ring of the rotor bearing or main bearing is connected at its end face facing the rotor hub to at least one hub-side plate of approximately circular extent, whose outer diameter is equal to or less than the diameter of the rotor bearing or main bearing, preferably equal to or less than the outer diameter of the inner ring. This plate, on the one hand, protects the parts of the inventive assembly located behind it, for example the parts of a gear mechanism, and, on the other hand, can guide and/or stabilize such parts.

Affixed to the hub-side plate, there can be a bearing bushing to which the sun gear of the planetary gear mechanism can be mounted. This is a simple method of mounting the sun gear of a planetary gear mechanism stationarily amid the gear mechanism.

The sun gear of the planetary gear mechanism can further be connected to the generator in order to drive it. Owing to its small number of teeth, the sun gear generally rotates faster than the driven unit of the planetary gear mechanism; consequently, the sun gear is particularly well suited to transmit this rapid rotation to the generator of the wind power plant.

If the planet gear carrier of the planetary gear mechanism is fixed to the chassis, frame or housing of the gondola of the wind power plant, then the rotation speed $n_{So}$ of the driving sun gear is greater than the rotation speed $n_{Ho}$ of the driven ring gear by the tooth count ratio $z_{Ho}/z_{So}$ of the ring gear to the sun gear:

$$n_{So} = n_{Ho} \cdot z_{Ho}/z_{So},$$

although in the opposite direction of rotation.

To fix the planet gear carrier, the latter can be disposed at, particularly fixed to, at least one generator-side plate, which in turn is disposed at that end face of the rotor bearing or main bearing which faces away from the rotor hub. A plate can also easily transmit relatively large torques in its plane and is therefore ideally suited for fixing the planet gear carrier in place.

The generator-side plate preferably is or can be connected to the outer ring of the rotor bearing or main bearing. These are both non-rotating parts, so they can be interconnected to form a subassembly.

A further advantage of the invention is that one, a plurality of, or preferably all of the planet gears are configured as one-piece and undivided. In this way, the planet gears can occupy the entire width between the hub-side and the generator-side plate, thus minimizing compressive stress on the tooth flanks.

It has proven particularly worthwhile for the planetary gear mechanism to have a transmission ratio $T = n_{Ho} \cdot n_{So}$, between the rotation speed $n_{Ho}$ of the ring gear and the rotation speed $n_{So}$ of the sun gear, which is within a range of 1:1.5 to 1:20, preferably a transmission ratio within a range of 1:2 to 1:12, particularly a transmission ratio within a range of 1:4 to 1:7, the rotation speed of the generator-side output drive being greater than the hub-side input rotation speed.

It is within the scope of the invention that the diameter of a planet gear is at least half the diameter of the sun gear, preferably at least exactly the same, particularly at least one and a half times the diameter of the sun gear.

The generator should not protrude in the radial direction beyond the rotor bearing or main bearing. If the outer diameter of the generator is approximately equal to the outer diameter of the rotor bearing or main bearing, the two parts can be moved around either individually or together inside the gondola, for example for purposes of cleaning, maintenance or repair.

The invention recommends disposing, particularly fixing, the stator of the generator at the generator-side plate of the main bearing or rotor bearing and/or at its outer ring. During operation, these parts are all anchored rotationally fixedly to the gondola support structure and can therefore be connected to one another without problems. They can thus, for example, be transported as a common assembly.

Because the generator rotor is connected to the sun gear of the planetary gear mechanism, it can be driven with maximal speed.

The invention is further optimized if a connection piece, preferably configured as a reducing piece, is provided between the rotor of the generator and the sun gear of the planetary gear mechanism. The purpose of this reducing piece is to compensate for the difference between the diameter of the generator rotor and the generally smaller diameter of the sun gear of the planetary gear mechanism.

A seal that can be provided between the connection piece or the sun gear, on the one hand, and the bushing or shaft guiding it, on the other hand, serves to keep any lubricant coming from the region of the bearing and/or the planetary gear mechanism away from the generator.

According to an advantageous further development of the invention, the connection piece, particularly the reducing piece, is coupled to, connected to or integrated with a support bearing. The purpose of this support bearing is to additionally stabilize the relatively fast-rotating generator rotor, and thus to rigorously counteract any potential imbalance.

The support bearing can be configured as a rolling bearing, so that the friction losses caused by it are minimal.

A particularly stable arrangement is obtained if the counter ring of the support bearing is fixed to or integrated with the connection piece at the generator-side plate of the rotor bearing or main bearing.

The rotor of the generator is preferably configured as disk-shaped, preferably circular-ring-shaped. In this case, the radial extent of a cross section through the rotor is preferably greater than its axial extent. With dimensioning of this kind, optimum use can be made of the space available in a gondola. Where appropriate, two or more such disk rotors can be arranged one behind the other in the axial direction to increase the power of the generator.

The generator can be equipped with permanent magnets. These are particularly suitable for being attached to or built into a disk rotor. In particular, magnetic plates can be attached to and/or embedded in the disk rotor for this purpose. The magnetic poles of these magnets are preferably located on their approximately planar end faces, facing the air gap.

With a disk rotor, an also disk-shaped air gap is formed between rotor and stator, the rotor preferably being located between two stator disks. To the extent that—as the invention also provides—the magnetic field generated by the magnets of the disk rotor passes through the air gap approximately perpendicular to the base thereof, the magnetic field will have an approximately axial course in relation to its axis of rotation. The generator is then an axial field generator, also commonly referred to as an axial generator.

It has been found that a particularly stable arrangement is obtained if the generator's stator embraces its rotor radially outwardly. The two stator disks are thus connected outwardly by a sort of yoke and thereby stabilize each other. Preferably applied to or inserted in the stator disks are electrical coils that embrace the magnetic flux from the rotor magnets to varying degrees, depending on the rotational position of the rotor, such that an electrical voltage, particularly an alternating voltage, is induced in these electrical coils. This voltage can, for example, be rectified and then reconverted to an alternating voltage with an oscillating frequency of 50 Hz, which can then be fed into a power grid.

Should the generator have channels for a preferably fluid cooling and/or temperature control medium, then this medium can be cooled actively. The necessary cooling systems can also be disposed in the gondola of the wind power plant.

The invention is further distinguished by a central passage through the generator and/or the planetary gear mechanism, for cables or the like. For example, control lines for the drives serving to adjust the pitch angle of the rotor blades can be led through this passage, for example with the aid of slip rings or other rotational decoupling means.

The assembly according to the invention can be fixed to or integrated with a preferably cast or welded support structure, which simultaneously serves as the load-bearing structure of the gondola and/or is connected to or integrated with an azimuth bearing for pivoting the gondola. An arrangement that is particularly simple statically is obtained in this way. The support structure can transmit the wind pressure force, for example by means of lateral diagonal struts, directly to a baseplate of the gondola, from which it is then relayed to the nacelle bearing of the wind power plant.

Finally, it is within the teaching of the invention that one or more fastening elements are provided at the end face, facing the hub, of a structure supporting the assembly according to the invention, in order to fix the hub of the wind turbine temporarily to the support structure during the removal or installation of the assembly according to the invention. These fastening elements must be strong enough to support the entire hub of the wind turbine, including all the blades. The main bearing or rotor bearing or an assembly connected thereto can then be inspected, maintained or repaired. The bearing is then reinstalled, and once the inventive fastening elements are released, the wind turbine is again able to rotate freely.

Additional features, details, advantages and effects based on the invention will become apparent from the following description of a preferred embodiment of the invention and by reference to the drawing. Therein:

Figure 1:
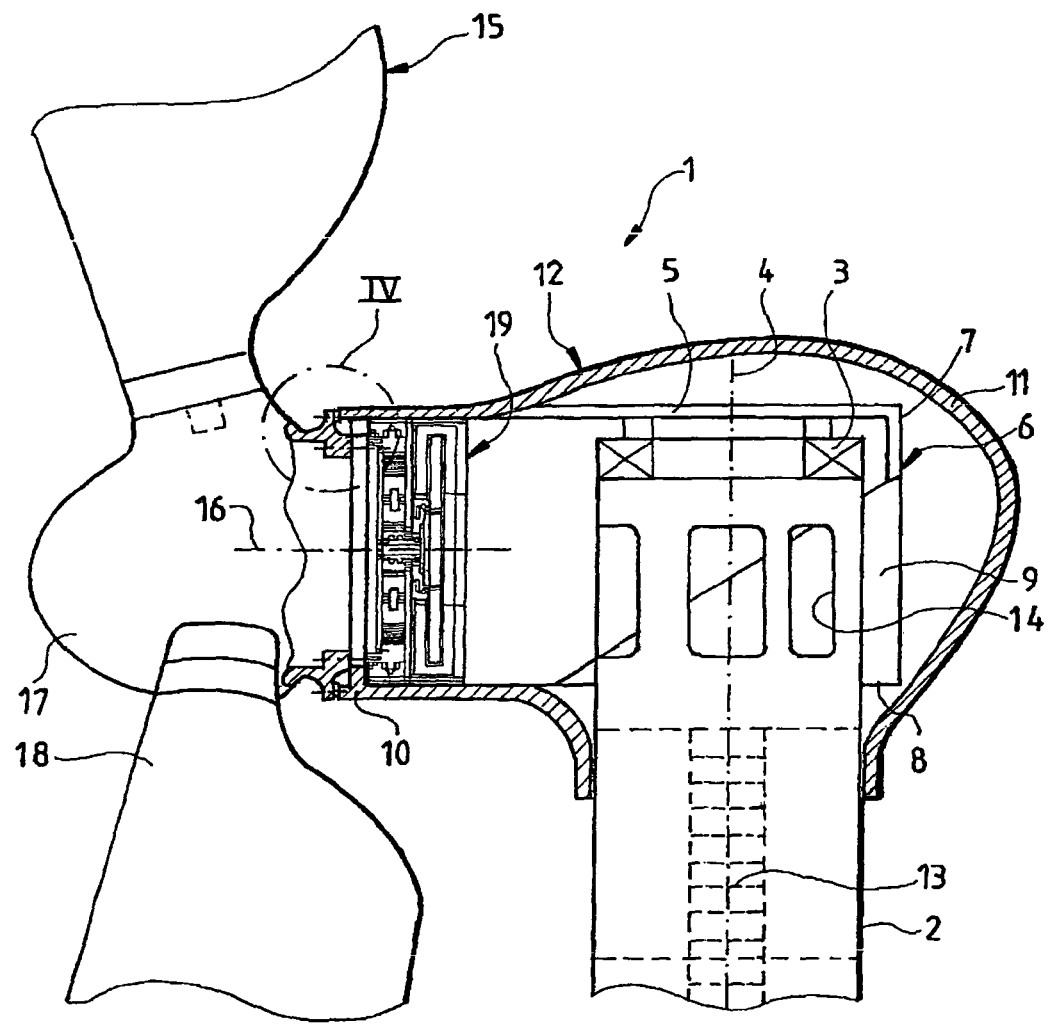
FIG. 1 is a vertical section through the gondola of a wind power plant comprising an assembly according to the invention.

The wind power plant 1 illustrated in the drawing is designed to be particularly maintenance-friendly. A nacelle bearing 3 illustrated only schematically in FIG. 1, for effecting azimuth adjustment, is placed in a horizontally lying position on the top end of a tower 2 of circular cross section.

Whereas one ring of this nacelle bearing 3 is fixed to the top side of the tower 2, the other ring can thus be pivoted about the tower axis 4. It is driven, for this purpose, by a motor (not shown), whose housing is, for example, attached to the tower 2, and whose pinion, for example, meshes with a set of teeth on the pivotable ring.

Bearing against the pivotable ring of the nacelle bearing 3 is a top plate or frame 5 of a support structure 6 that is able to pivot about the tower axis 4. This support structure 6 can further comprise a back wall 7 and a baseplate 8 with an opening for the tower 2. Side wall plates 9 connect the baseplate 8, the back wall 7 and the top plate or frame 5 to one another and thus lend sufficient rigidity to the support structure 6.

At their respective sides approximately opposite the back wall 7, the baseplate 8, the side wall plates 9 and the top plate or frame 5 are prolonged to an approximately circular mouth 10.

The entire space behind this mouth 10 is surrounded by a casing 11, which for aerodynamic reasons has a gently curving shape and is intended to keep wind and weather out of the inner chamber serving as the nacelle or gondola 12, which can be reached by maintenance personnel via a stairway or ladder 13 inside the tower 2 and upper egress openings 14 in the wall of the tower 2.

Whereas the tower 2 of the wind power plant 1 is stationary and the gondola 12 is able to pivot in the azimuthal direction on a vertical axis 4, the wind turbine 15 per se has an additional degree of freedom of movement, namely that of a rotation on a second axis 16, which extends away from the tower axis 4 in an approximately horizontal direction in the region of the gondola 12. The wind turbine 15 itself consists of a hub 17 from which a plurality of wings or blades 18 extend in an approximately radial direction, in relation to the hub axis 16. These blades 18, finally, are each mounted to the hub 17, in a respective blade bearing, so that they are able to rotate about their longitudinal axis, for example in order to adjust their pitch as a function of wind speed.

Figure 2:
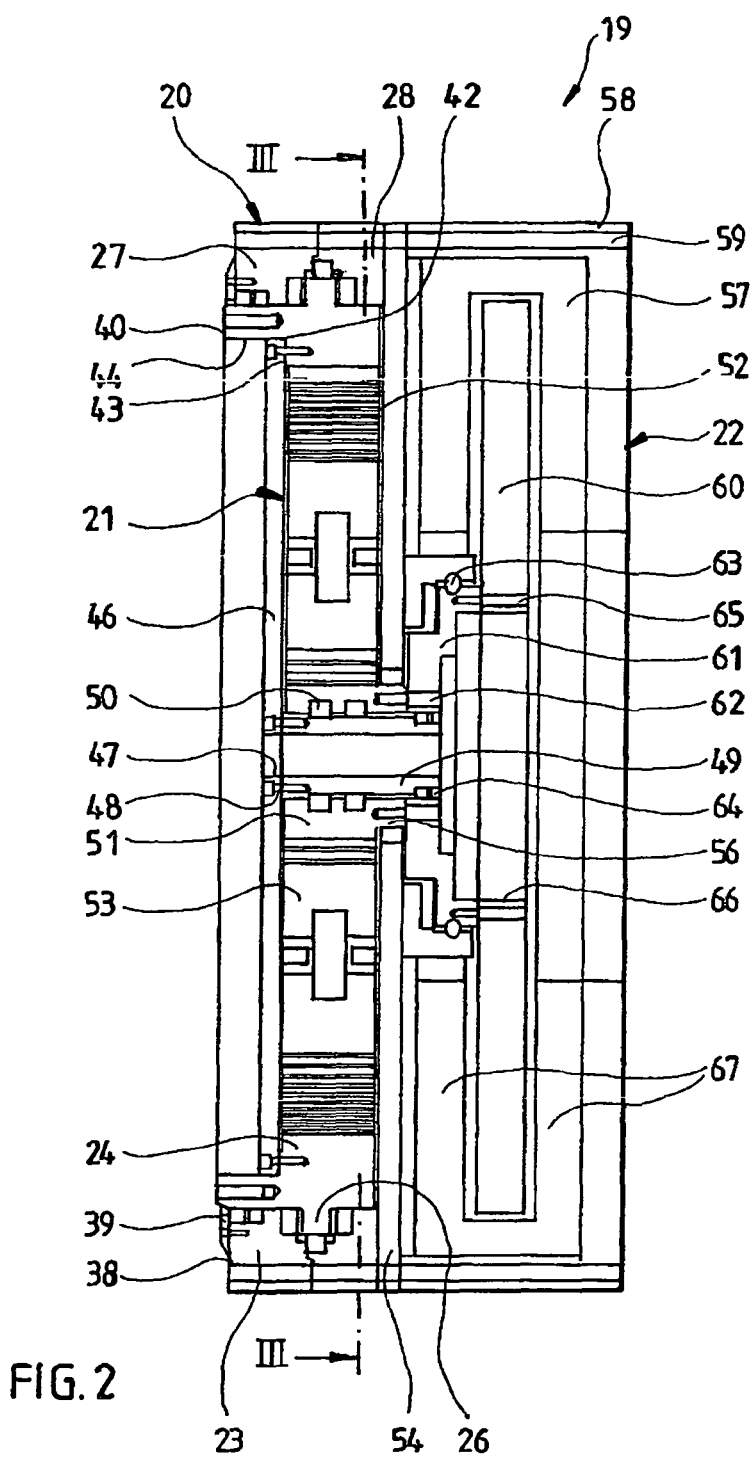
FIG. 2 is the assembly according to the invention from FIG. 1, but separated from the wind power plant.
Figure 3:
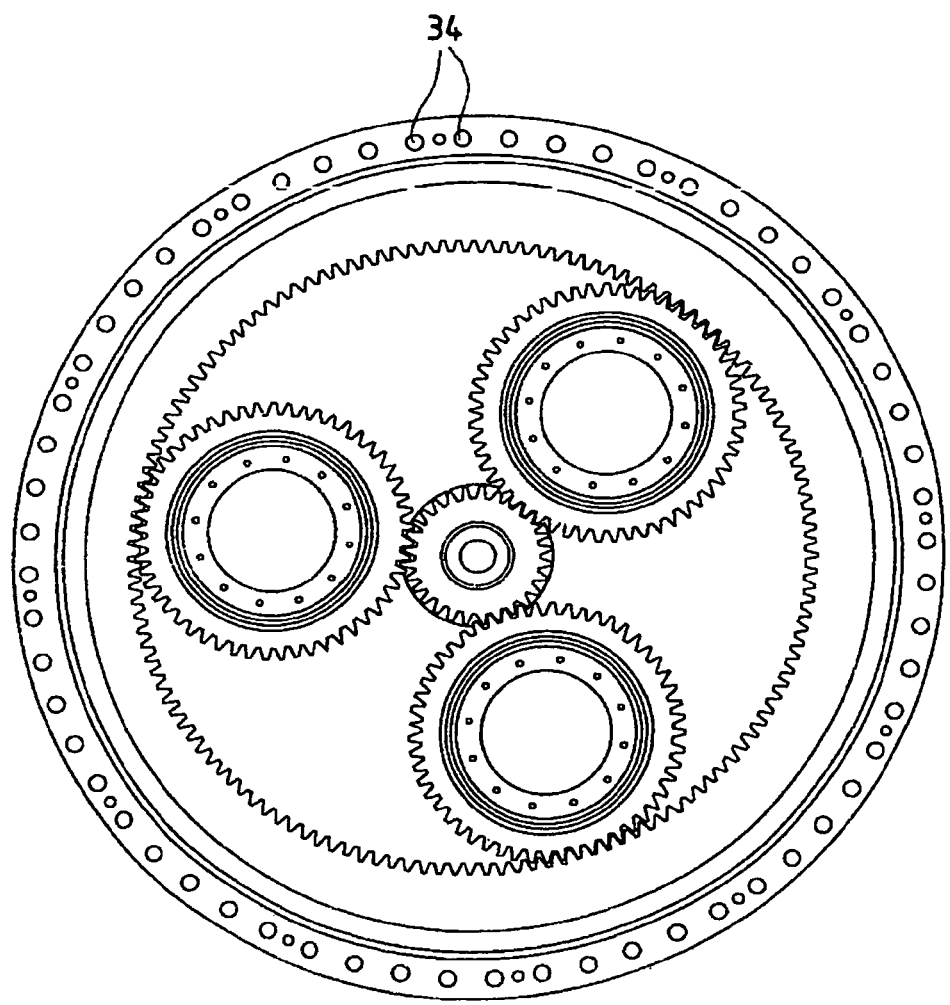
FIG. 3 is a section through FIG. 2 along line III-III.

As will be explained further below, the hub 17 is mounted to the support structure 6, rotatably about its hub axis 16, by means of an assembly 19 according to the invention, which is illustrated enlarged in FIG. 2.

This assembly 19 includes several functional units, specifically the actual main bearing or rotor bearing 20, a gear mechanism 21, particularly a step-up gear mechanism, and a generator 22.

Disposed at the side of this assembly 19 facing the hub 17 is the main bearing 20, which comprises two mutually concentric rings, an outer ring 23 and an inner ring 24.

The main bearing 20 is implemented as a rolling bearing, particularly as a roller bearing. As can be seen from FIG. 2, one ring, preferably inner ring 24, has a nose in the form of a fully circumferential flange 26, facing the ring gap 25, while the other ring, preferably outer ring 23, is divided in the region of this flange 26 into two subrings, specifically into a hub-side subring 27 and a generator-side subring 28. The two end faces 29, 30 and preferably also the peripheral face 31 of this flange 26 each serve as running surfaces for at least one respective row of preferably barrel-shaped rolling elements 32, 33, which also, at the same time, run along the counter ring. The two subrings 27, 28 have mutually aligned bores 34 through which screws 35 or bolts are passed to connect the two subrings 27, 28 to each other. These bores 34 preferably extend continuously from one end face of the particular subring 27, 28 to its opposite end face. By means of screws inserted therein, the outer ring 23 can thus be fixed to the support structure 6 of the gondola 12. The outer ring 23 can also be embraced on its outer face by a hollow-cylindrical portion 36 of the support structure 6 and guided thereby.

The gap 25 between the outer ring 23 and the inner ring 24 is preferably sealed in the region of the hub-side gap opening. This can be effected by means of one or more fully circumferential seals 37. This seal or these seals can be (partially) covered and held in place by, for example, a ring 39 fixed, for example screwed, to the hub-side end face 38 of the outer ring 23.

The outer, i.e., hub-side, end face 40 of the inner ring 24 serves as a connection surface for the hub 17. Located in this connection surface or end face 40 are a plurality of coronally arranged fastening means, preferably fastening bores, particularly blind bores with an internal thread, for screw-fastening the hub 17 of the wind turbine 15. By means of screws 41 inserted therein, the hub 17 is pressed against the connection surface 40 of the inner ring 24 and is lockingly, preferably friction-lockingly, fixed there.

Radially inside the connection surface 40—in relation to the hub axis 16—the outer ring 23 is provided with a recess 42 bounded by a planar, annular end-face portion 43 and by a concavely curved, hollow-cylindrical portion 44. Located in the planar end-face portion 43 are coronally distributed fastening bores 45 for screwing tight a hub-side cover plate 46 provided with a central opening 47.

The rim of this opening 47 is surrounded coronally by a plurality of fastening bores 48, to which is fixedly screwed a bushing 49 that extends from the cover plate 46 all the way through the main bearing 20. A toothed wheel 51 is mounted on this bushing 49—preferably by means of one or more rolling bearings 50—so as to be able to rotate about the hub axis 16. The toothed wheel 51 simultaneously forms the drive shaft of the gear mechanism 21.

The inner face of the inner ring 24 of the main bearing 20 is provided with a fully circumferential set of teeth 52, which transmit the rotational drive power from the wind turbine 15 to the gear mechanism 21.

Whereas the toothed wheel 51 serves as the sun gear of the gear mechanism 21 configured in the manner of a planetary gear mechanism, the fully circumferential set of teeth 52 at the inner face of the inner ring 24 of the main bearing 20 simultaneously forms its ring gear. The ring gear 52 has a much larger diameter than the sun gear 51. Disposed in the radial space between the sun gear 51 and the ring gear 52 is a plurality of toothed planet gears 53, each of which meshes with the sun gear 51 and the ring gear 52. The planet gears preferably have a larger diameter than the sun gear 51. For this reason, the number of planet gears 53 is limited to six at the most, preferably five or less, particularly four or less, for example three.

The planet gears 53 are preferably mounted to a common cage or planet gear carrier 54. This has the shape of a plate, which is fixed to the generator-side end face of outer ring 23, preferably via bores 55 that are aligned with the bores 34 in the outer ring 23, particularly in its subrings 27, 28, and are collectively engaged end to end by a respective fastening screw 35.

The generator-side plate 54 serving as the planet gear carrier also has a central opening, through which an end-face region 56 of the sun gear 51 is prolonged or at least accessible and serves as the output of the planetary gear mechanism 21.

Immediately adjacent the far side of the plate 54 serving as the planet gear carrier is the generator 22. This has an approximately disk-shaped form and is configured as an axial field generator.

Its stator 57 is fixed in the generator housing 58, which in turn has bores 59 that pass between its two end faces and are aligned on the one side with bores 55 in plate 54 and on the other side with bores 34 in outer ring 23. These bores 34, 55, 59 are collectively engaged from end to end by fastening screws 35, such that all these elements of the assembly 19—i.e., main bearing 20, gear mechanism 21 or planet gear carrier plate 54 and generator 22—can be fixed collectively to the support structure 6. Naturally, it would also be possible first to connect these parts to one another with fastening means specifically for that purpose and then fix them collectively to the support structure 6 with other fastening means, or first to connect the main bearing 20 to the support structure 6 and then fix the gear plate 54 and/or the generator 22 to the main bearing 20.

In contrast, the rotor 60 of the generator 22 is rotationally fixedly connected via a reducing piece 61 to the end-face region 56 of the sun gear 51, for example by means of axially parallel screw connections 62. The reducing piece 61 is necessary because the rotor 60 is preferably configured as annular, with an inner diameter that is generally greater than the outer diameter of the sun gear 51. The reducing piece 61 can further be braced against the generator-side plate 54 by means of an additional bearing 63, preferably by means of a rolling bearing, particularly by means of a ball bearing. This purpose is served, for example, by an outer ring of bearing 63, which, for its part, is attached to the generator-side plate 54. Additional seals 64 can further be provided in the region of the reducing piece 61, to ensure that lubricant cannot find its way from the main bearing 20 or out of the gear mechanism 21 into the generator 22.

The rotor 60 is preferably fixed to the reducing piece 61 by means of screw connections 65 coronally distributed along its inner rim 66 and extending parallel to the hub axis 16. Radially outside these fastening means, the disk-shaped rotor 60 is equipped with permanent magnets having magnet poles on their flat sides, such that an approximately axial magnetic field is established in the gap between the stator 57 and the rotor 60. To allow both end faces of the rotor 60 to be utilized, the stator 57 embraces the rotor 60 at its outer periphery. The stator 57 thus has an approximately U-shaped geometry in cross section. The two legs of this U-shaped stator cross sectional geometry each correspond to a respective circular ring 67, which extends next to the rotor disk 60 at a scant axial distance therefrom. Each of these two circular rings 67 is occupied by coils in which, when the rotor 60 turns, a voltage is induced by the respective embraced magnetic field, which varies during a rotation, and this voltage can then be tapped and—after electrical transformation, where appropriate—fed into a power grid.

As can be appreciated from the drawing, all the components of the assembly 19 according to the invention are centerless, so it is possible, for example, to lead cables or the like through a central opening and on into the hub 17, and thus, for example, to control the drives of the blade bearings and/or to supply them with current, for example via slip rings.

Figure 4:
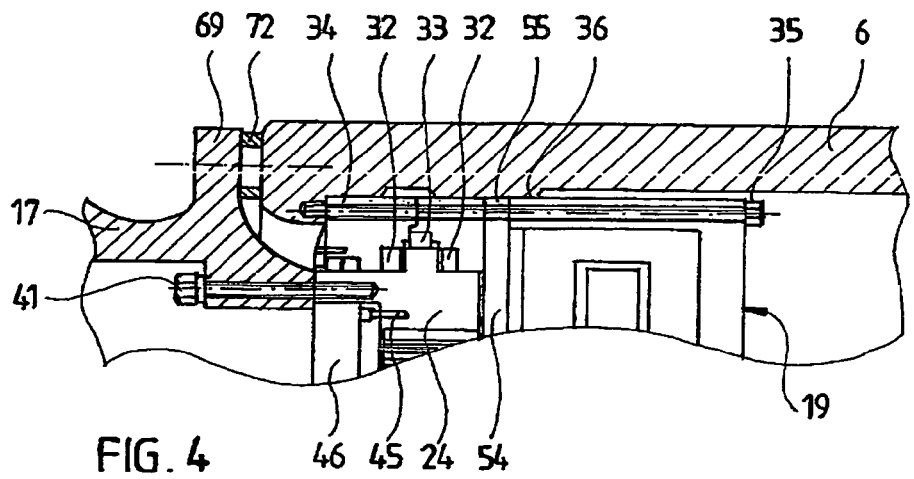
FIG. 4 shows detail IV from FIG. 1 in an enlarged representation, in the operating case.
Figure 5:
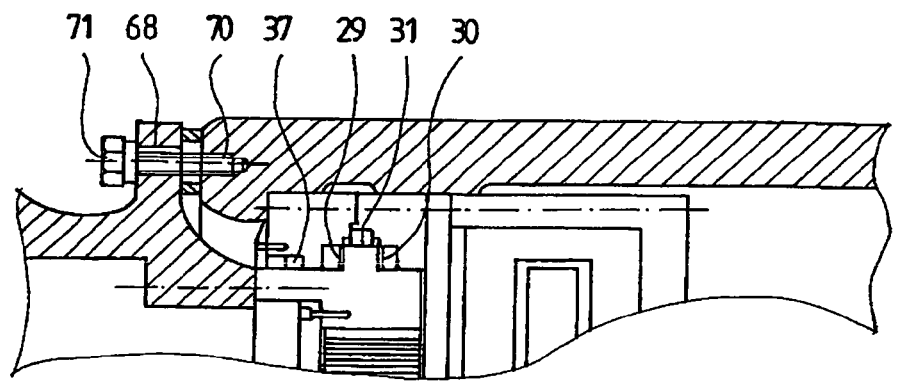
FIG. 5 is an illustration similar to FIG. 4, but in the repair or maintenance position.

FIGS. 4 and 5 illustrate another particularity of the design according to the invention, namely the region of the connection between the hub 17 and the inventive assembly 19.

As can be seen, this connection is embodied in the form of releasable screw connections 41 that can be released as necessary, for example in order to maintain, repair or even replace the components of the assembly 19 according to the invention.

So that the wind turbine 15 does not drop out in this case, and also so that it does not have to be lowered with a crane, additional fastening means 68 are provided at the hub 17, specifically for fixing the hub 17, including the blades 18, directly to the support structure 6. These fastening 68 are located radially farther outward than the screw connections 41 in relation to the hub axis 16. Whereas the screw connections 41 are preferably located inside the hub 17, the additional fastening means 68 are preferably located outside the hub 17. They can optionally be disposed in a fully circumferential flange 69 of the hub 17 or in individual radial extensions of the hub 17. The additional fastening means 68 are preferably bores arranged approximately parallel to the hub axis 16 in a fully circumferential flange 69 of the hub 17, which, at least in a given rotational position of the hub 17 or wind turbine 15, are exactly aligned each with a respective bore 70 in the support structure 6 and enable the hub 17 to be fixed temporarily to the support structure 6 by means of screws 71. Where appropriate, interposed spacer elements 72 in the manner of washers serve to maintain a suitable distance between the hub 17 and the support structure 6.

Figure 6:
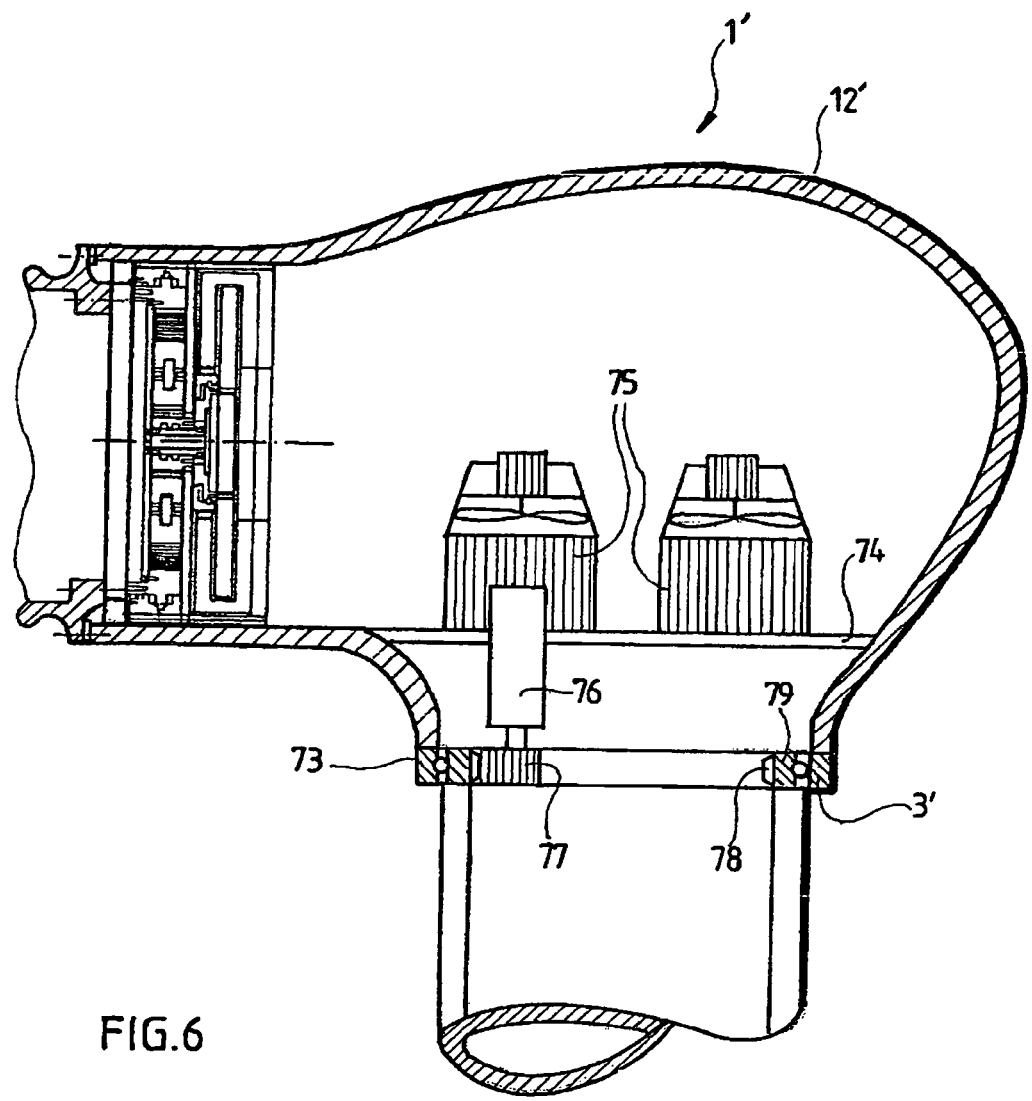
FIG. 6 is an illustration similar to FIG. 1 of a modified embodiment of the invention.

Finally, FIG. 6 illustrates another embodiment of a wind power plant 1'. This differs from the previously described embodiments primarily in the arrangement of the gondola 12' and the nacelle bearing 3', whereas the tower 2, the turbine 15, including the hub 17 and blades 18, and the inventive assembly 19 can be completely identical.

The most striking difference with respect to wind power plant 1 is that the ring of the nacelle bearing 3' that is not fixed to the tower 2 is anchored, not in the region of the top of the gondola 12', but in the region of the bottom thereof. FIG. 6 shows that the outer ring 73 of the nacelle bearing 3' is fixed in the bottom region of the support structure 6', which comprises, thereabove but still in the bottom region of the gondola 12', a baseplate 74 that is, for example, continuous except for an entry hatch. Additional elements can be anchored on or to this baseplate 74. These might include, for example, cooling systems 75 for cooling the generator 22, in which a, for example, fluid cooling medium can be cooled before it flows through cooling channels of the generator 22 and from there is ultimately recirculated to the cooling systems 75. By the same token, a drive motor 76 can also be anchored to this baseplate 74, to rotate the gondola 12' in the azimuthal direction, for example via a pinion 77 and a set of teeth 78 on the inside of the ring 79 of the nacelle bearing 3' that is fixed to the tower. Finally, the casing 11 of the gondola 12' can also be attached to the baseplate 74.

| List of Reference Numerals | |
|---|---|
| 1 | Wind power plant |
| 2 | Tower |
| 3 | Nacelle bearing |
| 4 | Tower axis |
| 5 | Frame |
| 6 | Support structure |
| 7 | Back wall |
| 8 | Baseplate |
| 9 | Side wall plate |
| 10 | Mouth |
| 11 | Casing |
| 12 | Gondola |
| 13 | Ladder |
| 14 | Egress opening |
| 15 | Wind turbine |
| 16 | Hub axis |
| 17 | Hub |
| 18 | Blade |
| 19 | Assembly |
| 20 | Main bearing |
| 21 | Gear mechanism |
| 22 | Generator |
| 23 | Outer ring |
| 24 | Inner ring |
| 25 | Ring gap |
| 26 | Flange |
| 27 | Hub-side subring |
| 28 | Generator-side subring |
| 29 | End face |
| 30 | End face |
| 31 | Peripheral face |
| 32 | Rolling element |
| 33 | Rolling element |
| 34 | Bore |
| 35 | Screw |
| 36 | Portion |
| 37 | Seal |
| 38 | End face |
| 39 | Ring |
| 40 | End face |
| 41 | Screw |
| 42 | Recess |
| 43 | End-face portion |
| 44 | Portion |
| 45 | Fastening bore |
| 46 | Cover plate |
| 47 | Opening |
| 48 | Fastening bore |
| 49 | Bushing |
| 50 | Rolling bearing |
| 51 | Sun gear |
| 52 | Ring gear |
| 53 | Planet gear |
| 54 | Plate |
| 55 | Bore |
| 56 | Region |
| 57 | Stator |
| 58 | Generator housing |
| 59 | Bore |
| 60 | Rotor |
| 61 | Reducing piece |
| 62 | Screw connection |
| 63 | Bearing |
| 64 | Seal |
| 65 | Screw connection |
| 66 | Rim |

-continued

| List of Reference Numerals | |
|---|---|
| 67 | Circular ring |
| 68 | Fastening means |
| 69 | Flange |
| 70 | Bore |
| 71 | Screw |
| 72 | Spacer element |
| 73 | Outer ring |
| 74 | Baseplate |
| 75 | Cooling system |
| 76 | Drive motor |
| 77 | Pinion |
| 78 | Teeth |
| 79 | Ring |

The invention claimed is:

1. An assembly comprising:
a connection for a rotor hub of a wind turbine of a wind power plant having a rotor rotation axis which points generally in a direction of wind during operation, for the purpose of absorbing forces and torques occurring there,
at least one main bearing for diverting axial and radial forces and tilting moments into a load-bearing structure of the wind power plant,
a device for extracting the rotational energy from the wind turbine, the device comprising a single-stage planetary gear mechanism integrated with the main bearing and planet gears mounted on a planet gear carrier and adapted to simultaneously mesh with a sun gear and a ring gear, and
a generator connected to an output side of the planetary gear mechanism and adapted to convert the rotational energy into electrical energy,
wherein an inner ring of the main bearing of the wind power plant:
is provided at one end face thereof a connection surface for connection to the rotor hub of the wind power plant;
is provided at its outer face with at least one raceway for rolling elements that simultaneously roll along at least one raceway of an outer ring; and
is provided at its inner face with a fully circumferential set of teeth from which rotational energy is tapped;
is connected at an end face thereof facing the rotor hub to at least one hub-side plate of generally circular configuration, whose outer diameter is equal to, or less than, the diameter of the main bearing, wherein affixed to the hub-side plate is a bearing bushing to which the sun gear of the planetary gear mechanism is mounted.

2. The assembly in accordance with claim 1, wherein the inner ring of said main bearing is provided on its end face with, facing the rotor hub, at the connection surface, connecting elements for attaching the rotor hub and comprising coronally distributed fastening bores comprising blind bores each with an internal thread.

3. The assembly in accordance with claim 2, wherein said raceway is provided on said inner ring with rolling elements running therealong, and having circumferential teeth and the connecting elements for attaching to the rotor hub are formed by machining or shaping a common base body.

4. The assembly in accordance with claim 1, wherein the main bearing comprises a selected one of a multi-row ball bearing, barrel roller bearing, and roller bearing.

5. The assembly in accordance with claim 1, wherein the inner ring of the main bearing is configured as a nose ring, and is provided with a circumferential flange on the outer face thereof, wherein running surfaces for one or more rows of rolling elements are disposed at the peripheral and/or end face(s) of the circumferential flange.

6. The assembly in accordance with claim 1, wherein the outer ring of the main bearing is divided into a hub-side sub-ring and a generator-side sub-ring.

7. The assembly in accordance with claim 1, wherein circumferential teeth on the inner face of the inner ring of the rotor main bearing simultaneously form the ring gear of the planetary gear mechanism.

8. The assembly in accordance with claim 1, wherein all the components of the assembly, including all the connected output drive elements, including the gear mechanism, and generator, are disposed in an axial direction behind the connection surface of said inner ring.

9. The assembly in accordance with claim 1, wherein said planetary gear is disposed radially inside the main bearing.

10. The assembly in accordance with claim 1, wherein said inner ring of the main bearing is connected at an end face thereof facing the rotor hub to at least one hub-side plate of generally circular configuration, whose outer diameter is equal to, or less than, the outer diameter of the inner ring.

11. The assembly in accordance with claim 1, wherein the sun gear of the planetary gear mechanism is drivingly connected to the generator.

12. The assembly in accordance with claim 11, wherein the planet gear carrier of the planetary gear mechanism is fixed to a chassis, frame or housing, of a gondola of the wind power plant, and is disposed at, or integrated with, at least one generator-side plate disposed at an end face of the main bearing facing away from the rotor hub.

13. The assembly in accordance with claim 12, wherein the generator-side plate is connectable to the outer ring of the main bearing.

14. The assembly in accordance with claim 1, wherein a selected number of the planet gears are configured as one-piece.

15. The assembly in accordance with claim 1, wherein the planetary gear mechanism is provided with a transmission ratio within a range of 1:1.5 to 1:20, the rotation speed of the generator-side output being greater than the hub-side input rotation speed.

16. The assembly in accordance with claim 8, wherein the generator does not protrude in a radial direction beyond the main bearing (20).

17. The assembly in accordance with claim 12, wherein a stator of the gear mechanism is fixed to a generator-side plate of the main bearing.

18. The assembly in accordance with claim 1, wherein a rotor of said generator is connected to the sun gear of said planetary gear mechanism.

19. The assembly in accordance with claim 18, wherein disposed between said rotor of said generator and said sun gear of said planetary gear mechanism is a connection piece configured as a reducing piece tapering in the radial direction.

20. The assembly in accordance with claim 19, wherein a seal is provided between the connection piece or the sun gear, on the one hand, and the bearing bushing, guiding same, on the other hand.

21. The assembly in accordance with claim 19, wherein the connection piece is coupled to a support bearing, a counter ring of said support bearing being fixed to the connection piece at a generator-side plate of the main bearing.

22. The assembly in accordance with claim 1, wherein the generator comprises an axial field generator.

23. The assembly in accordance with claim 1, wherein a stator of the generator radially outwardly surrounds a rotor thereof.

24. The assembly in accordance with claim 23, wherein the rotor of the generator is configured as circular-ring-shaped, and the generator is provided with permanent magnets.

25. The assembly in accordance with claim 12, wherein the assembly is fixed to a support structure, which serves as the load-bearing structure for the gondola, and/or is connected, to or integral with, an azimuth bearing for pivoting the gondola.

26. The assembly as in claim 1, wherein at least one fastening element is provided at an end face, facing the rotor hub, of the structure supporting the assembly, to fix the hub of the wind turbine temporarily to the support structure during removal and installation of the assembly.

* * * * *